No. 768,314. PATENTED AUG. 23, 1904.
E. VON SEEMEN, E. RÜHLE & O. FALLER.
CRYSTALLIZING APPARATUS.
APPLICATION FILED SEPT. 15, 1902.
NO MODEL.

Witnesses:
Arthur Thiergart.
Max Rinsch.

Inventors:
Erich von Seemen,
Ernst Rühle and
Oskar Faller.
By F. S. Hopper
Attorney.

No. 768,314.

Patented August 23, 1904.

UNITED STATES PATENT OFFICE.

ERICH VON SEEMEN AND ERNST RÜHLE, OF RHEINFELDEN, AND OSKAR FALLER, OF BASEL, SWITZERLAND.

CRYSTALLIZING APPARATUS.

SPECIFICATION forming part of Letters Patent No. 768,314, dated August 23, 1904.

Application filed September 15, 1902. Serial No. 123,543. (No model.)

*To all whom it may concern:*

Be it known that we, ERICH VON SEEMEN and ERNST RÜHLE, both subjects of the King of Prussia, German Emperor, residing at Rheinfelden, and OSKAR FALLER, a subject of the Grand Duke of Baden, residing at Basel, Switzerland, have invented new and useful Improvements in Crystallizing Apparatus, of which the following is a specification.

Our invention relates to improvements in crystallizing apparatus; and the objects of our improvement are, first, to provide in a vessel, whether open or closed, one or several partition-walls reaching downward to a certain height above the bottom and upward to a certain distance below the level of the liquid, so as to form in the vessel one or several crystallizing-spaces of comparatively large area, in which the liquid is allowed to descend slowly, whereby the crystallization is facilitated and accelerated; second, to provide in other spaces in the vessel a plurality of closed heating-pockets, into each of which the heating medium, preferably steam, is admitted and from which the condensed water is led off, and, third, to provide in all of said pockets several vertical tubes for allowing the liquid to circulate, the total free area of said vertical tubes and the spaces between said pockets and said partition-walls being smaller than that of said crystallizing-spaces, so as to cause the liquid to ascend quickly, and thereby to accelerate its evaporation.

We attain these objects by the apparatus illustrated in the accompanying drawings, in which—

Figure 1:
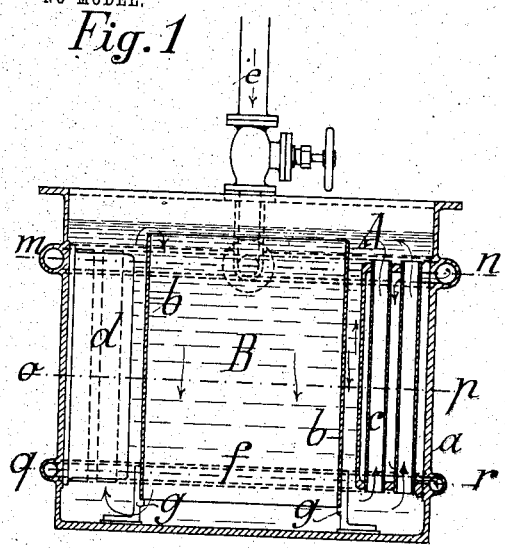
Figure 3:
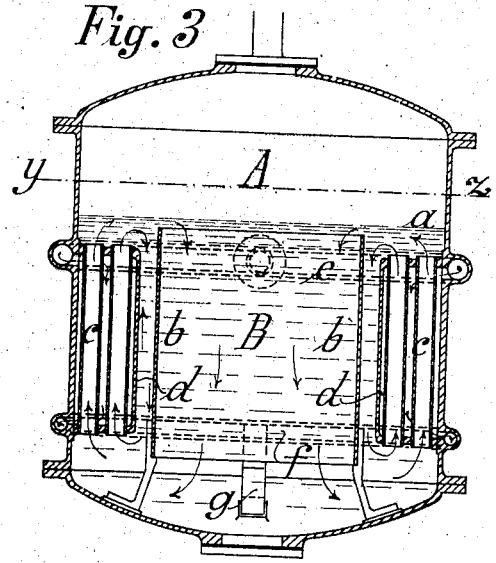
Figure 2:
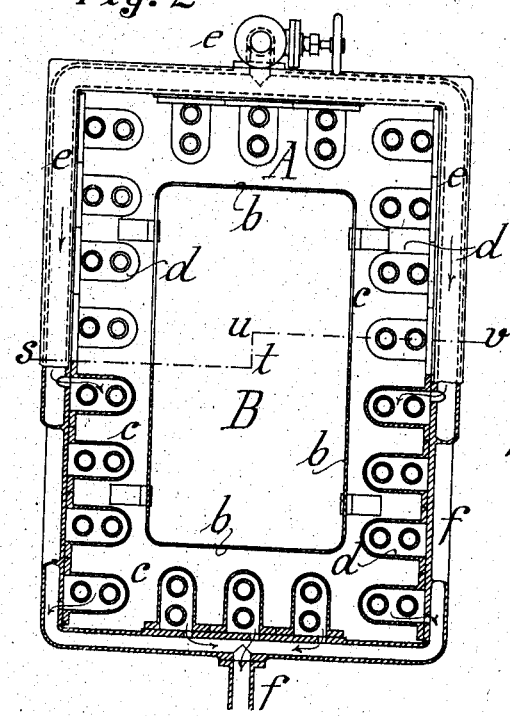
Figure 4:
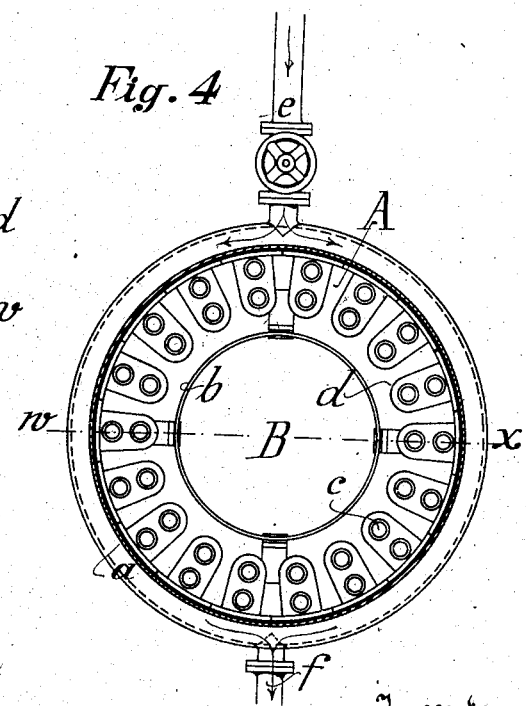

Figure 1 is a vertical cross-section through an open rectangular apparatus having a single crystallizing-space in its center, the section being taken through line *s z u v* of Fig. 2. Fig. 2 is in its upper half a plan of the apparatus shown in Fig. 1 and shows in its lower half horizontal sections in lines *m n*, *o p*, and *q r* of Fig. 1. Fig. 3 is a vertical section through a closed apparatus, the section being taken in line *w w* of Fig. 4; and Fig. 4 is a horizontal section in line *y z* of Fig. 3.

Similar characters of reference refer to similar parts in the several views.

In the open rectangular apparatus shown at Figs. 1 and 2 a single crystallizing-space B is formed by the partition-walls *b b*, which are supported by several convenient studs *g g*, so that they do not reach quite down, but to a certain height above the bottom, while they reach upward to a certain distance below the level. In the space A left between the partition-walls *b b* and the external walls *a* several closed pockets or vertical heating vessels *d* are arranged, which are secured to the walls *a* and reach neither as far down nor as far up as the walls *b*, so that they are constantly covered by the liquid. At their tops the heating vessels are connected to a distributing-pipe *e*, into which the heating medium, preferably steam, is admitted. They are each provided with two vertical tubes *c c*, which are secured in the same manner as ordinary boiler-tubes and allow the liquid to circulate. The condensed water is collected and led off by a pipe *f*.

As the horizontal area of the crystallizing-space B is larger than that of the spaces between the pockets *d d* and the walls *b b* and of the vertical tubes *c c*, it follows that the liquid on being heated by the steam in the pockets will rise quickly, while in the central space B it will not only cool down a little, but also it will sink slowly; and thus it will comparatively stagnate, while by the partition-walls *b b* it is protected against disturbances from the heating-pockets. By the quick circulation of the liquid along the pockets *d d* or *c c* its evaporation will be accelerated, while by the comparative stagnation of the liquid in the central space B the crystallization is greatly facilitated and accelerated, so that the crystals are rendered larger, more uniform, and valuable.

Figs. 3 and 4 represent a closed round apparatus in which a single crystallizing-space B is formed in the center by a cylindrical partition-wall *b*, which is secured by a suitable number of convenient supports.

The crystallizing apparatus may be modified in various respects without deviating from the spirit of our invention. The apparatus may be rectangular or square or round, or it may have any shape, and the partition walls may be varied so as to form one or several crystallizing-spaces, while in the remaining spaces or parts of the apparatus the heating-pockets are so arranged as to produce the necessary circulation of the liquid.

Having now described our invention, that which we wish to secure by Letters Patent of the United States is—

1. In a crystallizing apparatus, the combination with a vessel adapted to receive the liquid to be treated; partition-walls arranged in said vessel and dividing the latter into at least two compartments communicating with each other at the lower as well as at the upper edges of said walls; heating-pockets arranged in one of said compartments and forming passages between the latter and themselves; circulating-pipes extending through said pockets, and means for conducting a heating medium through the latter and around said pipes, substantially as described.

2. In a crystallizing apparatus, the combination with a vessel adapted to receive the liquid to be treated; partition-walls arranged in said vessel and dividing the latter into at least two compartments communicating with each other below the lower as well as above the upper edges of said walls; heating-pockets arranged in one of said compartments and extending neither as far down nor as far up as the said walls, and forming passages between the latter and themselves; circulating-pipes extending through said pockets, and means for conducting a heating medium through the latter and around said pipes, substantially as described.

3. In a crystallizing apparatus, the combination with a vessel $a$ adapted to receive the liquid to be treated; partition-walls $b$ arranged in said vessel and dividing the latter into at least one inner and one outer compartment A B communicating with each other below the lower as well as above the upper edges of said walls; separate heating-pockets $d$ arranged in the outer compartment and extending neither as far down nor as far up as the said walls, and forming passages between the latter and themselves, as well as between themselves; vertical circulating-pipes extending through said pockets, and means for conducting a heating medium through the latter and around said pipes, substantially as described.

In witness whereof we have hereunto set our hands in presence of two witnesses.

ERICH VON SEEMEN.
ERNST RÜHLE.
OSKAR FALLER.

Witnesses:
A. LIEBERKNECHT,
A. BOLLER.